(12) United States Patent
Sumioka

(10) Patent No.: US 10,187,578 B2
(45) Date of Patent: Jan. 22, 2019

(54) CONTROL APPARATUS OF VIBRATION ACTUATOR, METHOD FOR CONTROLLING VIBRATION ACTUATOR, DRIVING APPARATUS, IMAGING APPARATUS, INTERCHANGEABLE LENS, AND AUTOMATIC STAGE

(71) Applicant: CANON KABUSHIKI KAISHA, Tokyo (JP)

(72) Inventor: Jun Sumioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/208,320

(22) Filed: Jul. 12, 2016

(65) Prior Publication Data

US 2017/0019601 A1    Jan. 19, 2017

(30) Foreign Application Priority Data

Jul. 14, 2015  (JP) ................. 2015-140856

(51) Int. Cl.
*H04N 5/232* (2006.01)
*G02B 7/09* (2006.01)
*G02B 21/26* (2006.01)
*H02N 2/06* (2006.01)
*H02N 2/00* (2006.01)
*H04N 5/225* (2006.01)
*H02N 2/02* (2006.01)

(52) U.S. Cl.
CPC ........... *H04N 5/23296* (2013.01); *G02B 7/09* (2013.01); *G02B 21/26* (2013.01); *H02N 2/008* (2013.01); *H02N 2/0075* (2013.01); *H02N 2/06* (2013.01); *H02N 2/062* (2013.01); *H04N 5/23212* (2013.01); *H02N 2/0015* (2013.01); *H02N 2/026* (2013.01); *H04N 5/2254* (2013.01)

(58) Field of Classification Search
CPC ........... H04N 5/23212; H04N 5/23296; H04N 5/2254; H02N 2/0015; H02N 2/0075; H02N 2/008; H02N 2/026; H02N 2/06; H02N 2/062; G02B 7/09; G02B 6/3578
See application file for complete search history.

(56) References Cited

U.S. PATENT DOCUMENTS

| 5,714,831 | A | * | 2/1998 | Walker | H02N 2/062 310/316.01 |
| 8,792,051 | B2 | * | 7/2014 | Kudo | G02B 7/08 310/323.01 |
| 9,853,576 | B2 | * | 12/2017 | Kudo | H02N 2/06 |

(Continued)

FOREIGN PATENT DOCUMENTS

| CN | 1534856 A | 10/2004 |
| CN | 101491802 A | 7/2009 |

(Continued)

*Primary Examiner* — Daniel M Pasiewicz
(74) *Attorney, Agent, or Firm* — Canon U.S.A., Inc. IP Division

(57) ABSTRACT

A control apparatus of a vibration actuator performs control of the vibration actuator using a control amount calculated using both of a first deviation which is a difference between a command value and a relative position, and a gain changed in accordance with a second deviation which is a difference between a target position and the relative position, so as to reduce the gain in accordance with reduction of the second deviation.

43 Claims, 22 Drawing Sheets

(56) References Cited

U.S. PATENT DOCUMENTS

| | | | |
|---|---|---|---|
| 2004/0013420 A1* | 1/2004 | Hara | G02B 7/08 |
| | | | 396/55 |
| 2004/0189150 A1 | 9/2004 | Yamamoto et al. | |
| 2014/0071545 A1* | 3/2014 | Sumioka | G02B 27/646 |
| | | | 359/813 |
| 2014/0074297 A1* | 3/2014 | Sumioka | H02N 2/0075 |
| | | | 700/275 |

FOREIGN PATENT DOCUMENTS

| | | |
|---|---|---|
| JP | H03261380 A | 11/1991 |
| JP | H04-075478 A | 3/1992 |
| JP | 2000116159 A | 4/2000 |
| JP | 2002369557 A | 12/2002 |
| JP | 2007129804 A | 5/2007 |
| JP | 2007-209179 A | 8/2007 |

* cited by examiner

FIRST VIBRATION MODE

SECOND VIBRATION MODE

CONTROL APPARATUS OF VIBRATION ACTUATOR, METHOD FOR CONTROLLING VIBRATION ACTUATOR, DRIVING APPARATUS, IMAGING APPARATUS, INTERCHANGEABLE LENS, AND AUTOMATIC STAGE

BACKGROUND OF THE INVENTION

Field of the Invention

The present invention relates to a control apparatus of a vibration actuator, a method for controlling the vibration actuator, a driving apparatus, an imaging apparatus, an interchangeable lens, and an automatic stage.

Description of the Related Art

A vibration motor will be described as an example of a vibration actuator. The vibration motor is a non-electromagnetic driving motor which causes an electric-mechanical energy conversion element, such as a piezoelectric element, to generate high-frequency vibration by applying AC voltage on the element which is connected to an elastic member so as to extract vibration energy as a continuous machine motion.

If a driven member which is a target of driving is to be moved to a target position at high speed in a short time, overshoot may be generated in which the driven member moves over the target position before being stopped. Furthermore, a long period of time may be required for a stabilization time due to a return operation of reversely moving the driven member by a distance of the overshoot.

To address this problem, control apparatuses and a control method described below have been proposed.

Japanese Patent Laid-Open No. 04-075478 discloses a control apparatus including a deceleration control unit which reduces a target speed in a step-by-step manner until a target position is reached. Japanese Patent Laid-Open No. 2000-116159 discloses a control method for increasing a P-gain (a proportional) and an I-gain (an integral term) in PID control calculation before completion of positioning. Japanese Patent Laid-Open No. 3-261380 discloses a control apparatus which performs a stop operation by stopping supply of a driving voltage when a target position is reached after a reverse operation is performed without control immediately before the target position.

However, in the control apparatuses of vibration actuators according to the related arts, it is difficult to enhance responsivity of a stop operation as a driven member moves close to a target position without deteriorating controllability. Specifically, although a stop operation of turning off a voltage or the like may realize deceleration in a short time, controllability of a vibration actuator is deteriorated resulting in poor stop accuracy. If gradual deceleration control is performed, the driven member may be stopped without occurrence of overshoot. However, a long period of time is required for driving time.

SUMMARY OF THE INVENTION

According to an embodiment of the present invention, there is provided a control apparatus of a vibration actuator, the control apparatus including a control unit including a unit configured to output a first deviation which is a difference between a relative position between a vibrator and a driven member and a command value of the relative position, a gain control unit configured to output a gain based on a second deviation which is a difference between the relative position and a target position of the relative position, and a control amount calculation unit configured to output a control amount to be used to control driving of the vibrator using the first deviation and the gain. The gain control unit reduces the gain output in accordance with reduction of the second deviation. The relative position between the vibrator and the driven member is changed due to driving of the vibrator.

According to another embodiment of the present invention, there is provided a method for controlling a vibration actuator including a vibrator including an electric-mechanical energy conversion element and a driven member being in contact with the vibrator in a pressurization manner. The method includes obtaining a first deviation which is a difference between a command value of a relative position between the vibrator and the driven member and the relative position, obtaining a second deviation which is a difference between a target position of the relative position and the relative position, reducing a gain in accordance with reduction of the second deviation, and generating an AC signal for driving the vibrator in accordance with the gain and the first deviation.

Further features of the present invention will become apparent from the following description of exemplary embodiments with reference to the attached drawings.

DESCRIPTION OF THE EMBODIMENTS

First Embodiment

An example of a vibration actuator according to the present invention will be described with reference to the accompanying drawings. The vibration actuator of a first embodiment includes a vibrator and a driven member.

Figure 2A:
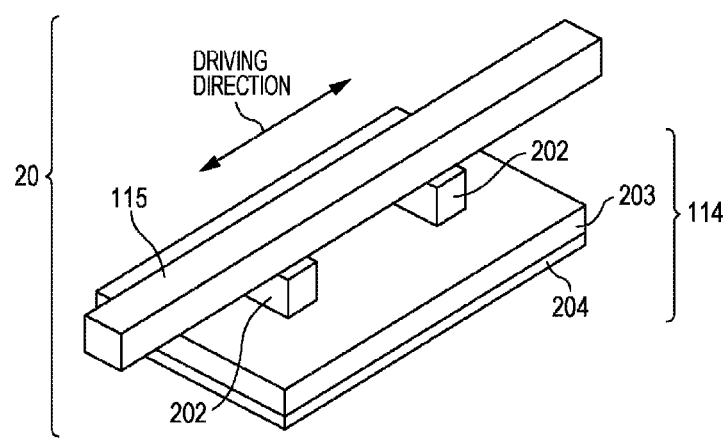
FIGS. 2A to 2D are diagrams illustrating a driving principle of a linear driving type vibration actuator.
Figure 2B:
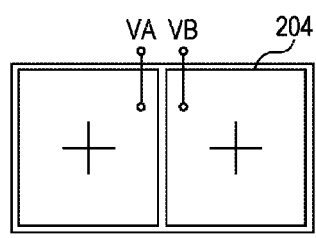
Figure 2C:
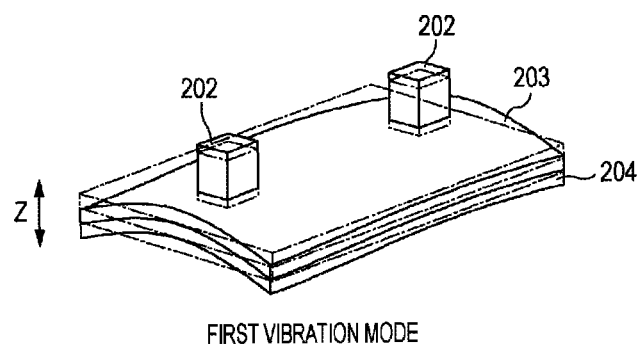
Figure 2D:
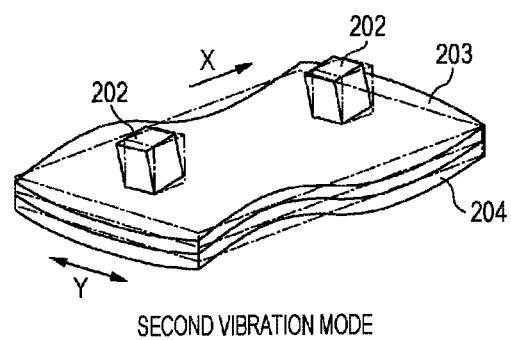

FIGS. 2A to 2D are diagrams illustrating a driving principle of a linear driving type vibration motor as an example of the vibration actuator. The vibration motor illustrated in FIG. 2A includes a vibrator 114 including an elastic member 203 and a piezoelectric element 204 which is an electric-mechanical energy conversion element adhering to the elastic member 203 and a driven member 115 driven by the vibrator 114. Two vibration modes illustrated in FIGS. 2C and 2D are generated by applying an AC voltage on the piezoelectric element 204 so that the driven member 115 which is brought into contact with projection portions 202 in a pressurization manner is moved in arrow directions.

FIG. 2B is a diagram illustrating an electrode pattern of the piezoelectric element 204. Two electrode regions which are obtained by evenly dividing a region on the piezoelectric element 204 into two which are arranged in a longitudinal direction of the piezoelectric element 204 are formed on the piezoelectric element 204 of the vibrator 114, for example. Furthermore, polarization directions of the electrode regions are the same (+). An AC voltage (VB) is applied to one of the two electrode regions on the piezoelectric element 204 which is on a right side in FIG. 2B and an AC voltage (VA) is applied to the other of the two electrode regions which is on a left side.

It is assumed that the AC voltages VB and VA have a frequency in the vicinity of a resonance frequency of a first vibration mode and have the same phase, the entire piezoelectric element 204 (the two electrode regions) stretches at a certain moment and shrinks at another moment. As a result, the vibrator 114 generates vibration of the first vibration mode illustrated in FIG. 2C. Therefore, the projection portions 202 displace in an upper direction (a Z direction).

Furthermore, it is assumed that the AC voltages VB and VA have a frequency in the vicinity of a resonance frequency in a second vibration mode and have phases shifted from each other by 180 degrees, the right electrode region of the entire piezoelectric element 204 shrinks and the left electrode region stretches at a certain moment. The relationship is reversed at another moment. As a result, the vibrator 114 generates vibration of the second vibration mode illustrated in FIG. 2D. Therefore, the projection portions 202 displace in a driving direction (a conveyance direction or an X direction).

Accordingly, vibration obtained by synthesizing the first and second vibration modes may be activated by applying an AC voltage having a frequency in the vicinity of a resonance frequency of the first and second modes to the electrodes of the piezoelectric element 204.

In this way, by synthesizing the two vibration modes, the projection portions 202 perform an elliptic motion in a cross section which is perpendicular to a Y direction (in a direction which is vertical to the X direction and the Z direction) in FIG. 2D. The driven member 115 is driven in the arrow direction of FIG. 2A by the elliptic motion. The direction in which the driven member 115 and the vibrator 114 move relative to each other, that is, the direction in which the driven member 115 is driven by the vibrator 114 (the X direction in this embodiment) is referred to as a "driving direction".

Furthermore, a generation rate of the first vibration mode to the second vibration mode may be changed by changing a phase difference between the AC voltages to be applied to the evenly-divided electrodes. In the vibration motor, a speed of the driven member may be changed by changing the generation rate.

Although a case where the vibrator 114 does not move and the driven member 115 moves is described as an example in the foregoing description, the present invention is not limited to this. A position of a portion of the driven member 115 and a position of a portion of the vibrator 114 which are contact with each other are at least relatively changed. For example, the driven member 115 may be fixed while the vibrator 114 is moved or both of the driven member 115 and the vibrator 114 may be moved. Specifically, the term "drive" means, in the present invention, change of a relative position between the driven member and the vibrator, and it is not necessarily the case that a position of the driven member (a position of the driven member using a position of a casing including the driven member and the vibrator as a reference, for example) is changed.

The vibration actuator is used for autofocus driving of a camera, for example. High-accurate positioning control is required for the autofocus driving, and position feedback control using a position sensor is performed, for example. A speed of the vibration actuator 20 may be controlled by controlling a frequency of an AC voltage signal to be applied to the piezoelectric element 204, a phase difference between signals of two phases, and a pulse width. For example, as a driving frequency becomes close to a resonance frequency of the piezoelectric element 204, larger vibration amplitude is obtained and a lens of a driving target may be driven at higher speed.

The positioning control in the autofocus driving will be described. A focus lens driven by the vibration actuator 20 is accelerated to a predetermined speed by the control apparatus from a start position, driven at a constant speed, and decelerated when moving close to a target position where the focus lens is to be stopped. In general, a high-speed focus is desired, and therefore, the vibration actuator 20 is controlled so that the focus lens is moved to the target position at high speed in a short time. Therefore, there arise a problem in overshoot and a problem in that a long period of time is required for a stabilization time due to a return operation. Use of the control apparatus of the vibration actuator 20 of this embodiment may enhance responsivity of the stop operation as the target position is reached and reduce the overshoot and the stabilization time without deteriorating controllability.

Figure 3:
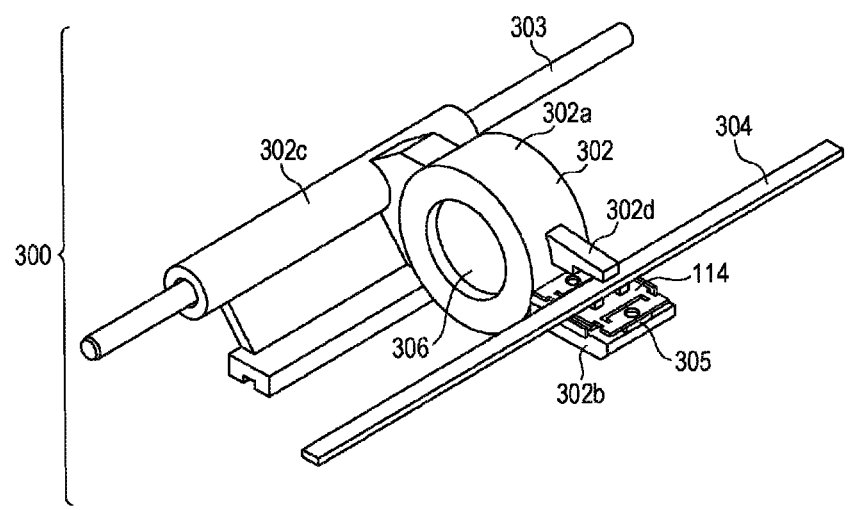
FIG. 3 is a diagram illustrating a driving mechanism of a lens included in a lens barrel.

FIG. 3 is a diagram illustrating a driving mechanism of a lens included in a lens barrel according to this embodiment. A driving mechanism of a lens holder of the vibration actuator 20 includes a vibrator, a lens holder, and first and second guide bars which hold the lens holder in a slidable manner and which are arranged in parallel to each other. In this embodiment, the second guide bar serves as the driven member 115, and a case where the second guide bar is fixed and the vibrator and the lens holder are integrally moved is described.

The vibrator generates relative movement force between the vibrator and the second guide bar which is in contact with projection portions of an elastic member by an elliptic motion of the projection portions of the vibrator generated by a driving voltage applied to an electric-mechanical energy conversion element. By this, the lens holder fixed to the vibrator may be moved along the first and second guide bars.

Specifically, a driving mechanism 300 of the driven member 115 includes a lens holder 302, a lens 306, the vibrator 114 connected to a flexible print substrate, a pressurization magnet 305, two guide bars 303 and 304, and a base, not illustrated. Here, the vibrator 114 will be described as an example of the vibrator.

Each of the first and second guide bars 303 and 304 has opposite ends held by and fixed to the base, not illustrated, so that the guide bars 303 and 304 are arranged in parallel to each other. The lens holder 302 includes a cylindrical holder portion 302a, a holding portion 302b for holding and fixing the vibrator 114 and the pressurization magnet 305, and a first guide portion 302c which is engaged with the guide bar 303 and which functions as a guide.

The pressurization magnet 305 included in a pressurizing unit has a permanent magnet and two yokes disposed on opposite ends of the permanent magnet. A magnetic circuit is formed between the pressurization magnet 305 and the guide bar 304 so as to generate suction power between the pressurization magnet 305 and the guide bar 304. The pressurization magnet 305 is disposed separately from the guide bar 304, and the guide bar 304 is disposed in contact with the vibrator 114.

The suction power gives applied pressure a portion between the guide bar 304 and the vibrator 114. Two projection portions of the elastic member are in contact with the second guide bar 304 in a pressurization manner so as to form a second guide portion. The second guide portion forms a guide mechanism using the suction power caused by magnetic force. The vibrator 114 and the second guide bar 304 are separated from each other by external force or the like, and this is addressed as described below.

Specifically, when an anti-falling portion 302d included in the lens holder 302 abuts on the second guide bar 304, the lens holder 302 returns to a desired position. When a desired AC voltage signal is supplied to the vibrator 114, driving force is generated between the vibrator 114 and the second guide bar 304, and the lens holder 302 is driven by the driving force.

Figure 1:
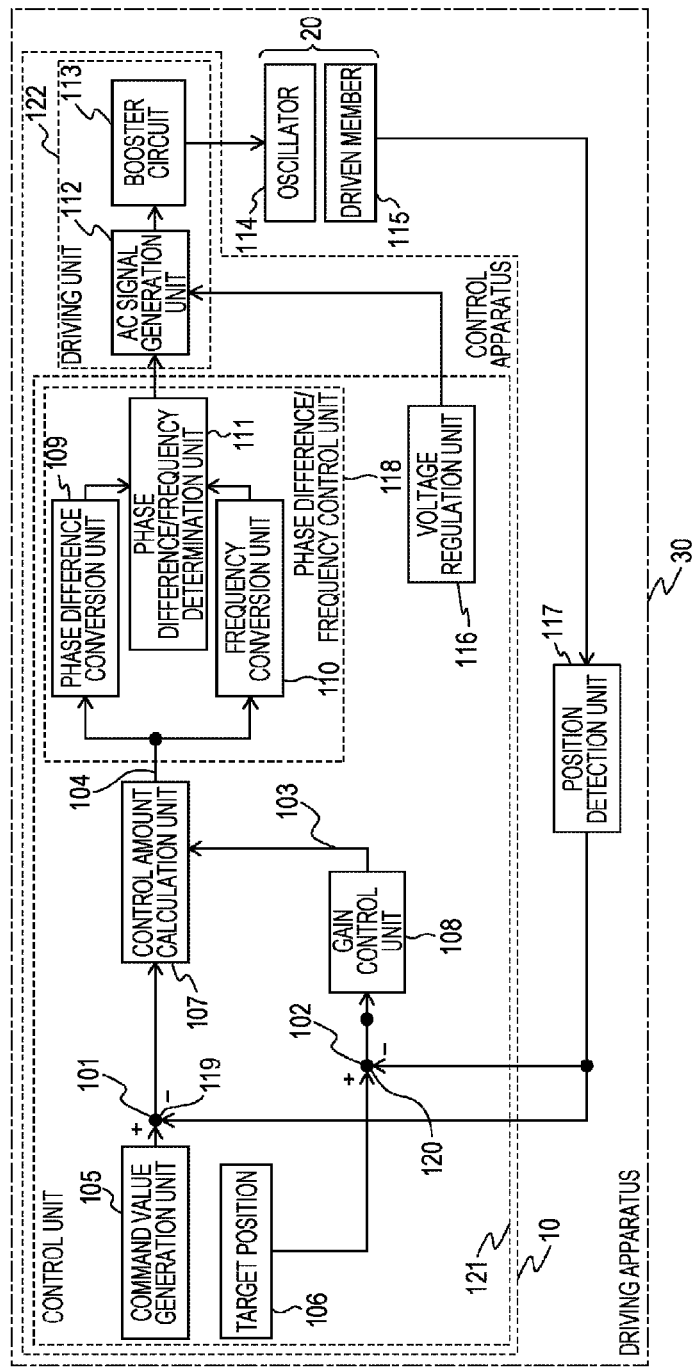
FIG. 1 is a diagram illustrating a vibration actuator and a control apparatus of the vibration actuator according to a first embodiment of the present invention.

FIG. 1 is a diagram illustrating the control apparatus and a driving apparatus of the vibration actuator 20 according to this embodiment. A driving apparatus 30 includes the vibration actuator 20 including the vibrator 114 and the driven member 115, a control apparatus 10 which controls the vibration actuator 20, and a position detection unit 117 which detects a relative position of the vibrator 114 and the driven member 115. The control apparatus 10 includes a control unit 121 and a driving unit 122.

The control unit 121 generates a signal having information on control of driving of the vibrator 114 using a first deviation which is a difference between a relative position between the vibrator 114 and the driven member 115 and a command value of the relative position and a gain. The gain is determined based on a second deviation which is a difference between a target position of the relative position and the relative position. For example, the control unit 121 includes a command value generation unit 105, a control amount calculation unit 107, a phase difference/frequency control unit 118, a gain control unit 108, and a voltage regulation unit 116, and the driving unit 122 includes an AC signal generation unit 112 and a booster circuit 113.

The command value generation unit 105 generates a command value of the relative position between the vibrator 114 and the driven member 115 for each time. Furthermore, a first subtractor 119 calculates a difference between the relative position between the vibrator 114 and the driven member 115 detected by the position detection unit 117 and the command value as a first deviation 101. Therefore, the first subtractor 119 functions as a first deviation output unit. Furthermore, a second subtractor 120 calculates a difference between a final target position 106 and the relative position as a second deviation 102. Therefore, the second subtractor 120 functions as a second deviation output unit.

The control amount calculation unit 107 calculates and outputs a control amount 104 using both of the first deviation 101 and a gain 103 which is changed based on the second deviation 102. The gain 103 is a control gain obtained based on the second deviation 102 by the gain control unit 108 such as a look-up table. The control amount calculation unit 107 calculates the control amount 104 using a PID compensator or the like as described below.

Here, the command value associated with the relative position between the vibrator 114 and the driven member 115 means a value associated with a relative position output from the command value generation unit 105 for each time, and one command value is output from the command value generation unit 105 for each position control sampling, for example. The position control sampling indicates, in FIG. 1, for example, one cycle from an obtainment of the first deviation 101, through input of an AC signal to the vibrator 114 and detection of a relative speed and a relative position between the vibrator 114 and the driven member 115, to a time immediately before another obtainment of the vibrator 114.

More specifically, the position control sampling indicates a cycle below, for example, in FIG. 1. The first deviation 101 is obtained from the command value and the detection signal, the second deviation 102 is obtained from the target position and the detection signal, the gain 103 is obtained based on the second deviation 102, and the control amount 104 is obtained using the obtained gain 103 and the obtained first deviation 101. A control parameter is obtained from the obtained control amount 104, the vibrator 114 is driven by applying an AC signal based on the control parameter through the booster circuit 113 to the vibrator 114 so that a relative speed and a relative position between the vibrator 114 and the driven member 115 are detected as detection signals. One cycle started when the first and second deviations 101 and 102 are obtained and terminated immediately before the next first and second deviations 101 and 102 are obtained is referred to as "position control sampling".

Note that the command value associated with the relative position may be obtained from a detected relative speed instead of a relative position obtained by the position detection unit 117.

Furthermore, the target position associated with the relative position between the vibrator 114 and the driven member 115 is a relative position to be finally reached, and is not changed every position control sampling.

The PID compensator adds outputs of compensators having a proportion function (P), an integration function (I), and a differential function (D). The PID compensator is generally used for constituting a control system which is stable and which has high accuracy by compensating a phase delay and a gain of a control target.

The control amount 104 is supplied to the phase difference/frequency control unit 118 serving as a control parameter conversion unit, and an output of the phase difference/frequency control unit 118 is supplied to the AC signal generation unit 112. The phase difference/frequency control unit 118 may include a phase difference conversion unit 109, a frequency conversion unit 110, and a phase difference/frequency determination unit 111, for example. The phase difference conversion unit 109 and the frequency conversion unit 110 convert the control amount 104 into a phase difference and a frequency, respectively, which are control parameters of an AC voltage signal which drives the vibration actuator 20.

The phase difference/frequency determination unit 111 outputs a signal associated with the phase difference and the frequency obtained based on the control amount 104 as described below, and controls a driving speed and a driving direction of the vibration actuator 20 in accordance with the obtained phase difference and the obtained frequency. The AC signal generation unit 112 generates an AC signal of two phases in accordance with the phase difference, the frequency, and pulse width information supplied from the voltage regulation unit 116. The booster circuit 113 includes a coil and a transformer, for example, and an AC signal which is increased to a desired driving voltage by the booster circuit 113 is applied to the piezoelectric element of the vibrator 114 so as to drive the driven member 115.

A position sensor, not illustrated, disposed on the driven member 115 or the vibrator 114 detects the relative position between the vibrator 114 and the driven member 115. The relative position is fed back to the control amount calculation unit 107 in accordance with the first and second deviations 101 and 102 so that the vibration actuator 20 is subjected to feedback control so as to follow the command value issued for each time. Note that, although a two-phase driving control apparatus which drives a piezoelectric element serving as an electric-mechanical energy conversion element in two phases is described as an example, the present invention is not limited to the two-phase driving and may be applied to vibration actuators of two or more phases.

The control unit 121 includes a digital device, such as a CPU or a PLD (including an ASIC) and an element, such as an A/D converter. The AC signal generation unit 112 included in the driving unit 122 has a CPU, a function generator, and a switching circuit, for example, and the booster circuit 113 includes a coil and a transformer, for example. Note that each of the control unit 121 and the driving unit 122 may be formed by one element or one circuit and may be formed by a plurality of elements or a plurality of circuits. The processes may be executed by any of the elements or any of the circuits.

The control apparatus and a configuration of the control apparatus according to this embodiment have been described hereinabove. A difference between the first and second deviations 101 and 102 will now be described in detail.

Figure 4A:
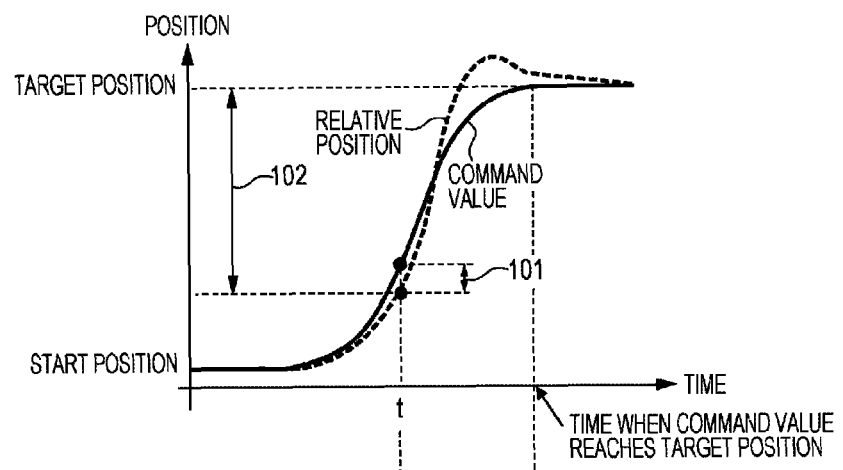
FIGS. 4A and 4B are diagrams illustrating differences between first and second deviations.
Figure 4B:
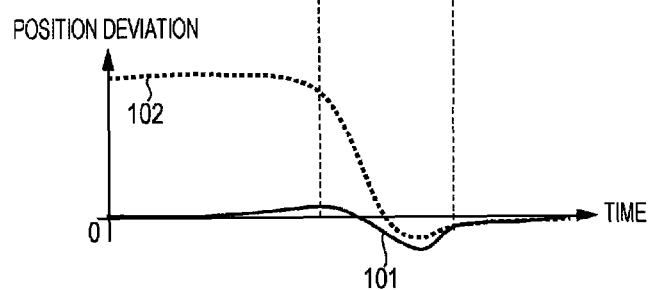

FIGS. 4A and 4B are diagrams illustrating a difference between the first and second deviations 101 and 102. Specifically, FIG. 4A is a diagram illustrating changes of the command value and the relative position where an axis of abscissas denote time and an axis of ordinates denotes a position. The command value is positional information set for each time and is output in an S shape, for example, starting from a driving start position and terminated in the target position. The vibration actuator 20 is driven in accordance with the command value and follows the command value which changes for each time.

In FIGS. 4A and 4B, from start of driving, a period of time in which an inclination of the command value is increased is referred to as an "acceleration driving period", a period of time in which the inclination is constant is referred to as a "constant speed driving period", a period of time in which the inclination of the command value is reduced is referred to as a "deceleration driving period", and a period of time in which the command value is constant which is started when the command value matches the target position is referred to as a "stop driving period".

General vibration actuators are accelerated so as to reach a maximum speed while a time delay is generated relative to a command value immediately after driving is started, and thereafter, decelerated with overshoot due to inertia of a driven member. When a relative position exceeds a target position, such a vibration actuator performs a setting while the relative position is reversely moved by a distance in which the relative position exceeds the target position, that is, the vibration actuator performs a return operation before being stopped. Consequently, the relative position forms a trajectory indicated by a dotted line in FIG. 4A.

Here, the first and second deviations in a position at a certain time t will be described. The first deviation indicates a deviation between the command value and the relative position. This is a parameter indicating accuracy of following to the command value for each time. On the other hand, the second deviation is a parameter indicating a deviation between the target position and the relative position and a remaining distance to the target position for each time.

The first and second deviations which change with time are illustrated in FIG. 4B. At a time when the command value reaches the target position, the first and second deviations are the same value. Furthermore, in a case where the relative position exceeds the target position, that is, in a case of the overshoot, the second deviation has a negative value, and in a case where the relative position exceeds the command value, the first deviation has a negative value.

Next, various units will be described in detail.

Figure 5A:
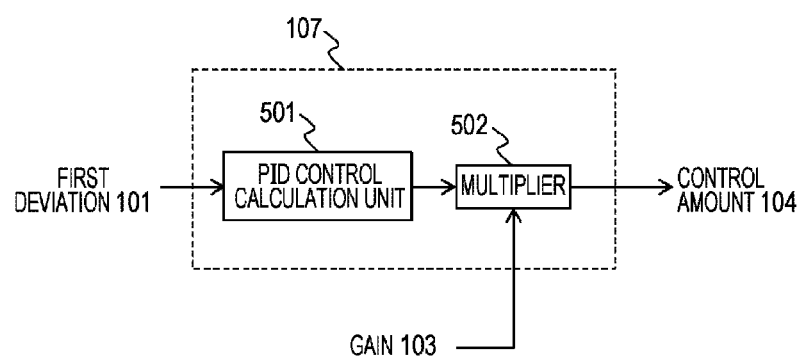
FIGS. 5A and 5B are diagrams illustrating a control amount calculation unit according to the present invention.
Figure 5B:
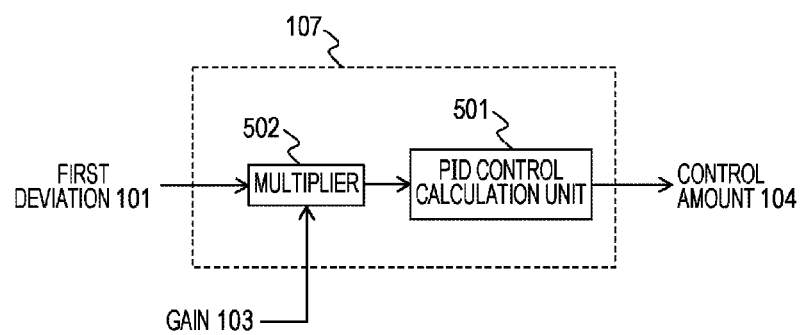

FIGS. 5A and 5B are diagrams illustrating the control amount calculation unit 107 according to this embodiment. The control amount calculation unit 107 calculates the control amount 104 using both of the first deviation 101 and the gain 103 which is changed based on the second deviation 102. As a method for the calculation, two configurations are illustrated in FIGS. 5A and 5B. As illustrated in FIG. 5A, a PID control calculation unit 501 performs PID calculation on the first deviation 101, and a multiplier 502 multiplies a result of the calculation by the gain 103. Although a general PID calculation is used in this embodiment, the present invention is not limited to this and the same effect may be obtained when another compensator, such as a modification of a PID controller or an H infinite controller, is used.

Alternatively, the multiplier 502 may multiply the first deviation 101 by the gain 103 in a first stage, and the PID control calculation unit 501 may perform the PID calculation using a result of the multiplication as illustrated in FIG. 5B. In both of the configurations illustrated in FIGS. 5A and 5B, the same control amount 104 is output.

Next, the gain 103 which is changed in accordance with the second deviation 102 will be described. FIGS. 6A to 6D are diagrams illustrating look-up tables to be used in the gain control unit 108 according to the present invention. In FIGS. 6A to 6D, when a sign of the second deviation 102 is inverted, a direction of an elliptic motion of a driving unit of the vibrator 114 is also inverted.

Figure 6A:
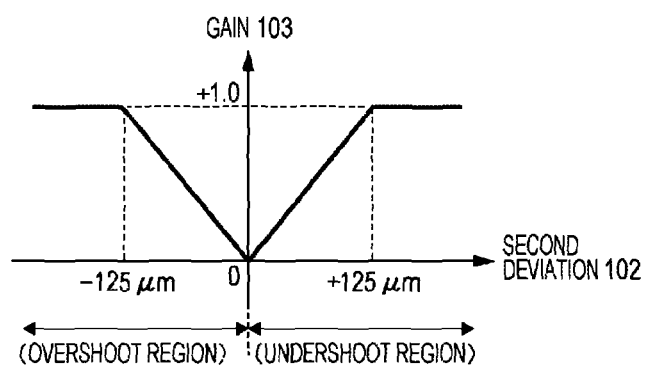
FIGS. 6A to 6D are diagrams illustrating look-up tables to be used in a gain control unit according to the present invention.

A basic table will now be described with reference to FIG. 6A. An axis of abscissae indicates the second deviation 102 and an axis of ordinates indicates the gain 103. First, an undershoot region on a right side in FIG. 6A will be described. The undershoot region indicates a region in which the relative position has not reached the target position, that is, a region in which a movement is performed at constant speed to the target position (a constant driving period) or a region in which deceleration movement is performed (a deceleration driving period).

In a region in which the second deviation 102 is equal to or larger than +125 µm, the gain 103 is constant, that is, 1.0, and the gain 103 is reduced as the second deviation 102 is reduced in a period from start of deceleration to the target position. When the second deviation 102 is 0 µm, the gain 103 is 0, and the gain control unit 108 increases the gain 103 again in an overshoot region in which the relative position exceeds the target position.

As described below, the vibration actuator control apparatus 10 and the vibration actuator control method of this embodiment may reduce a control amount by reducing the gain 103 before being stopped and may be immediately stopped by controlling an ellipse ratio, amplitude, or a driving direction of the elliptic motion performed by the driving unit. Although the gain 103 is changed in the region equal to or smaller than ±125 µm, this value is preferably set in the deceleration driving period before the vibration actuator 20 is stopped, that is, a phase difference control region described below.

Figure 6B:
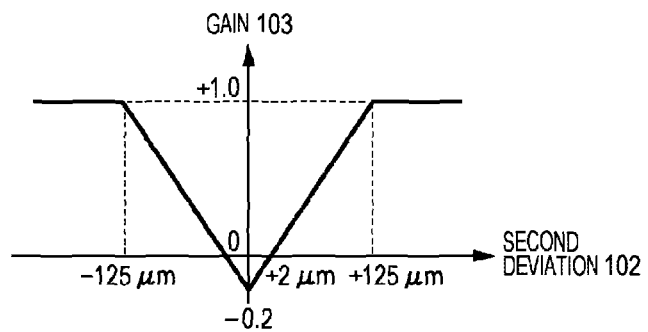

FIG. 6B is a diagram illustrating a case where a region in which the gain 103 is a negative value is additionally provided in the vicinity of the target position so that inverse brake control is performed. The gain 103 is reduced so that the second deviation 102 becomes +2 µm, and a sign of the gain 103 is inverted at a value corresponding to a position in the vicinity of the target position. Specifically, the driving direction is inverted since a sign of the control amount 104 is inverted. This functions as the inversion brake operation and a stop operation may be efficiently performed. Although the gain 103 has a negative value when the second deviation 102 is ±2 µm in this embodiment, a deviation corresponding to target accuracy of a stop setting (the stop driving period) is set.

Here, in FIG. 6B, after the second deviation 102 becomes 0, the gain 103 is reduced to a negative value of approximately −2 µm. In this way, unstable controllability of the vibration actuator 20 is avoided. At a time of driving, if the gain 103 equal to or larger than 0 is to be obtained when the second deviation 102 becomes 0, two values of the gain 103, that is, a value obtained when the second deviation 102 becomes 0 and a value obtained when the second deviation 102 becomes equal to or larger than 0 may be obtained, and accordingly, controllability is degraded.

Accordingly, to realize stable driving of the vibration actuator 20, such a driving period is provided. Here, the driving temporarily promotes the overshoot since both of the second deviation 102 and the gain 103 are negative values. However, an amount of overshoot may be reduced when compared with the related arts as a whole. Furthermore, the amount of overshoot may be further reduced if the driving period is reduced.

Figure 6C:
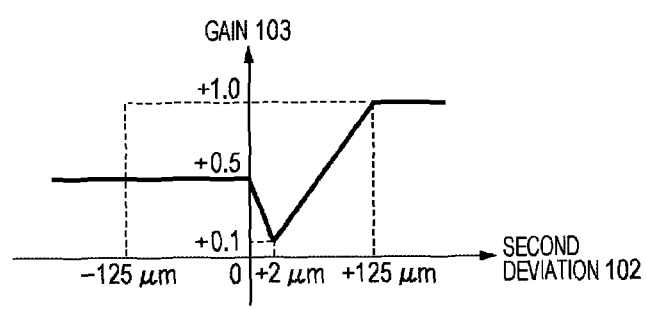

FIG. 6C is a diagram illustrating improvement of accuracy of the stop setting. The gain 103 is reduced so that the second deviation 102 becomes +2 µm, and increased again when the second deviation 102 becomes +2 µm which corresponds to a position in the vicinity of the target position. Specifically, although control based on the second deviation 102 is dominant until the second deviation 102 reaches +2 µm, a rate of control based on the first deviation 101 is increased a little in the vicinity of the target position. In this way, the relative position may reach the target position without generation of the overshoot region.

Figure 6D:
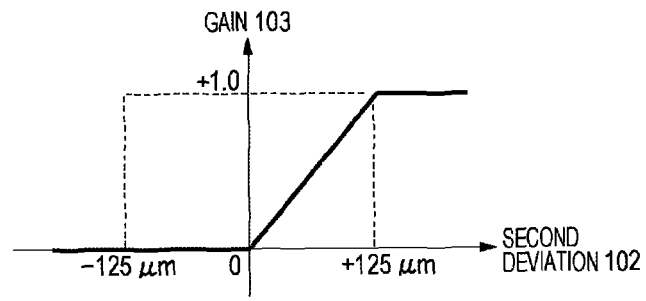

FIG. 6D is a diagram illustrating a modification in which the gain 103 is 0 in the entire overshoot region. In this case, if overshoot occurs in the vibration actuator 20, driving force of the elliptic motion of the driving unit forcibly becomes 0.

Furthermore, the look-up tables described above may be mathematized.

As described above, use of the control apparatus of the vibration actuator 20 of this embodiment may enhance responsivity of the stop operation as the relative position reaches the target position and reduce the overshoot and the stabilization time without deteriorating controllability.

Figure 7A:
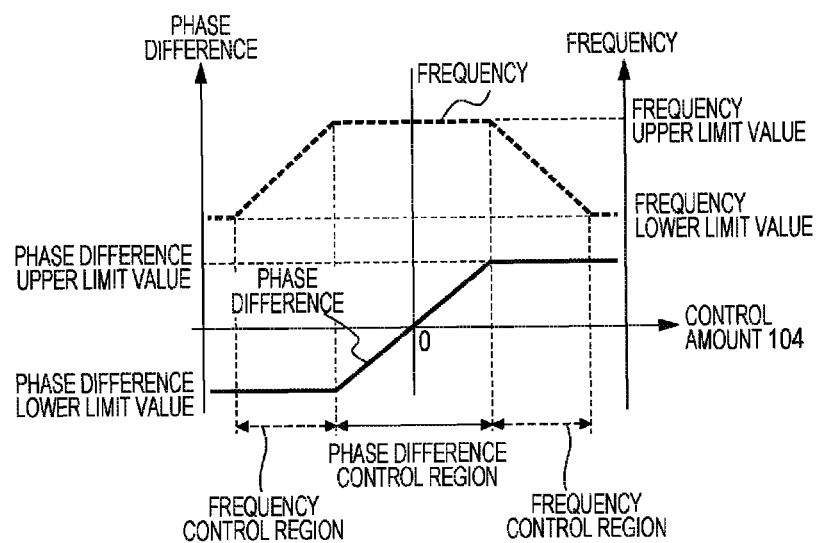
FIGS. 7A and 7B are diagrams illustrating output of a phase difference/frequency determination unit according to the present invention.
Figure 7B:
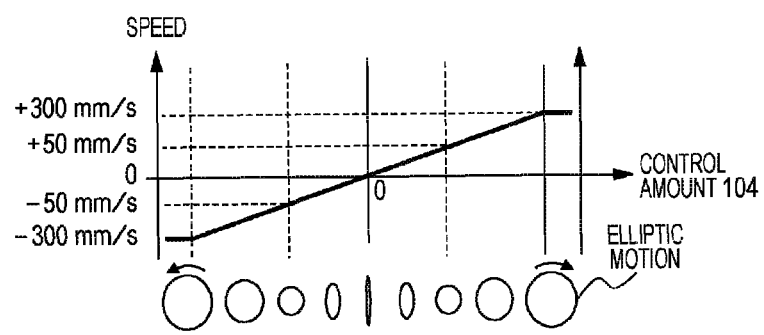

FIGS. 7A and 7B are diagrams illustrating output of the phase difference/frequency determination unit 111 according to the present invention. FIG. 7A is a diagram illustrating a phase difference and a frequency output based on the control amount 104. An axis of abscissae denotes the control amount 104, a left side of an axis of ordinates denotes a phase difference, and a right side of the axis of ordinates denotes a frequency. As illustrated in FIG. 7A, the phase difference/frequency determination unit 111 of the phase difference/frequency control unit 118 controls the phase difference and the frequency such that the phase difference is changed in a region in which an absolute value of the control amount 104 is small (a phase difference control region). Furthermore, the phase difference/frequency determination unit 111 controls the frequency and the phase difference such that the frequency is changed in a region in which the absolute value of the control amount 104 is large (a frequency control region). That is, the phase difference/frequency determination unit 111 performs switching between driving based on the phase difference and control based on the frequency in accordance with the control amount 104.

Specifically, in the phase difference control region, the frequency is fixed to a frequency upper limit value, and inversion of a driving direction, stop of driving, and a speed in a low-speed region are controlled by changing the phase difference from the phase difference upper limit value to a lower limit value (for example, +110 degrees to −110 degrees). In the frequency control region, the phase difference is fixed to a phase difference lower limit value or an upper limit value, and a speed in a high-speed region is controlled by changing the frequency from the frequency upper limit value to a lower limit value (for example, in a range from 92 kHz to 89 kHz).

FIG. 7B is a diagram illustrating a speed of the vibration actuator 20 based on the control amount 104. An axis of abscissae denotes the control amount 104 and an axis of ordinates denotes the speed. As described above, the phase difference control is performed in the low speed region in a range from −50 mm/s to +50 mm/s whereas frequency control is performed in a high speed region other than the low speed region. In the phase difference control, the ellipse ratio of the elliptic motion of the driving unit is changed since the phase difference is controlled as illustrated in FIG. 7B, and a direction of the elliptic motion is changed when a sign of the phase difference is inverted. Furthermore, in a vertically long shape in which the ellipse ratio is 0, a speed is 0.

On the other hand, in the frequency control, ellipse amplitude is changed while the ellipse ratio of the elliptic motion is constant since the frequency is controlled. By the control, the phase difference/frequency control unit 118 sets the phase difference and the frequency such that a speed is increased as linear as possible relative to the control amount 104.

Figure 8A:
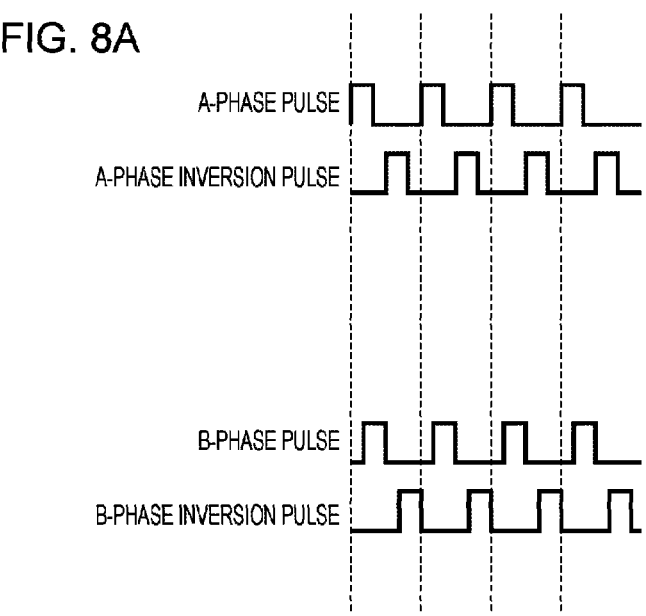
FIGS. 8A and 8B are diagrams illustrating a configuration of an AC signal generation unit according to the present invention.
Figure 8B:
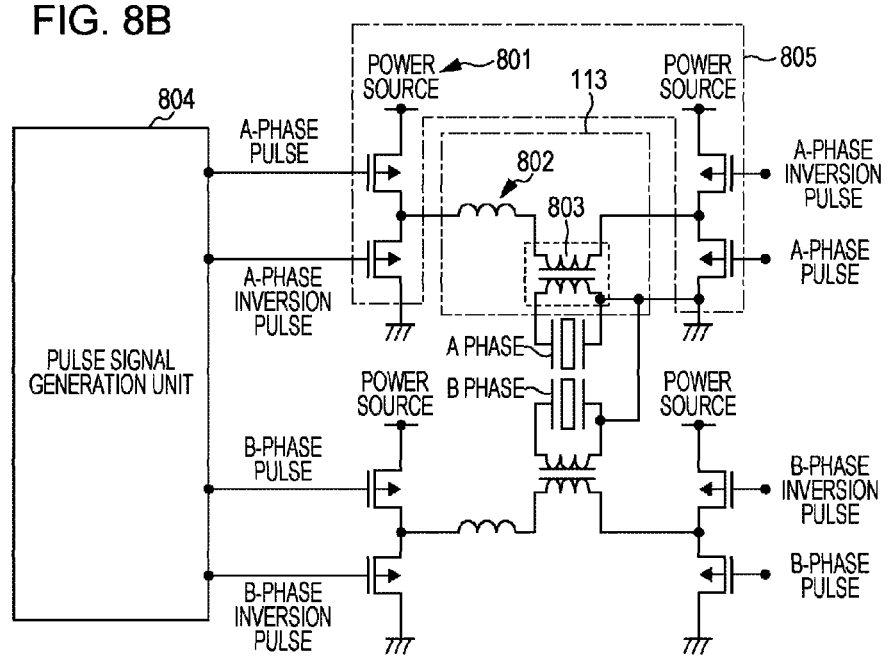

FIGS. 8A and 8B are diagrams illustrating a configuration of the AC signal generation unit 112 according to this embodiment. FIG. 8A is a diagram illustrating AC pulse signals of two phases output from the AC signal generation unit 112. The AC signal generation unit 112 includes a pulse signal generation unit 804 and a switching circuit 805. FIG. 8B is a diagram illustrating the AC signal generation unit 112 and the booster circuit 113 which applies an AC voltage signal to the piezoelectric element.

As a concrete example, a function of generating an AC voltage to be applied to the piezoelectric element in an A phase of the AC signal generation unit 112 will be described. The same configuration may be applied to a function of generating an AC voltage to be applied to the piezoelectric element in a B phase. The pulse signal generation unit 804 generates a first A-phase pulse signal and a first A-phase inversion pulse signal each of which has information on a phase difference and a frequency corresponding to a phase difference and a frequency output from the phase difference/frequency determination unit 111. The first A-phase pulse signal and the first A-phase inversion pulse signal, which are input pulse signals, are supplied to the switching circuit 805. The switching circuit 805 generates an AC voltage signal of a rectangle wave by performing a switching operation on a DC voltage supplied from a power source 801 at a timing of an input pulse signal.

The booster circuit 113 includes a coil 802 and a transformer 803, for example. The AC voltage signal of the rectangle wave is supplied to the booster circuit 113 which applies an AC voltage signal of a SIN wave which is boosted to a predetermined driving voltage to the piezoelectric element of the A phase. Similarly, an AC voltage signal of a SIN wave which is boosted to a predetermined driving voltage is applied to the piezoelectric element of the B phase.

Figure 9A:
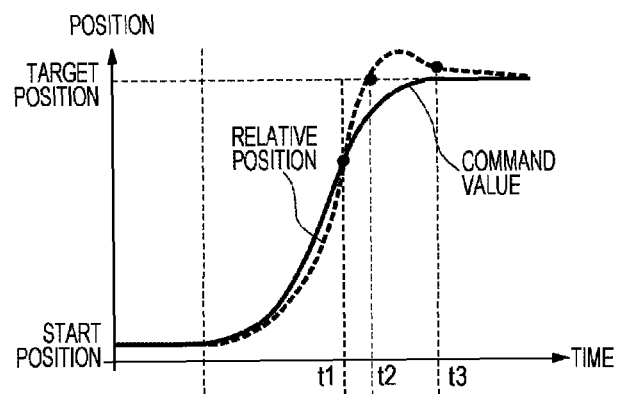
FIGS. 9A to 9E are timing charts of the control apparatus according to the first embodiment.

FIGS. 9A to 9E are timing charts of the control apparatus according to this embodiment. Specifically, FIG. 9A is a diagram illustrating change with time of the command value 104 and the relative position from the start position to the target position. Here, control of this embodiment will be described while time points t1, t2, and t3 are focused.

Figure 9B:
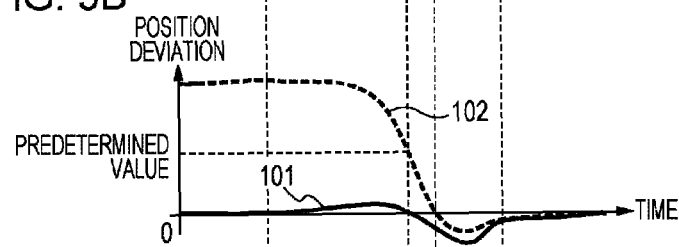

FIG. 9B is a diagram illustrating change with time of the first deviation 101 and the second deviation 102. It is assumed that a time point when the second deviation 102 reaches a predetermined value (+125 μm, for example) is denoted by "t1".

Figure 9C:
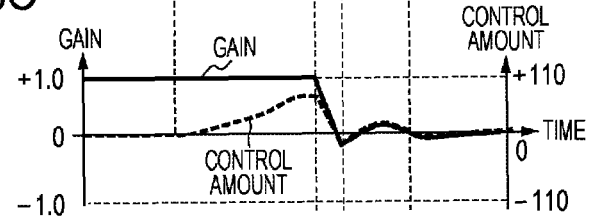

FIG. 9C is a diagram illustrating change with time of the gain 103 and the control amount 104 based on the second deviation 102. Note that the gain 103 is obtained when the look-up table for performing the inversion brake control of FIG. 6B is employed.

The gain 103 maintains 1.0 until the time point t1, and therefore, the control amount 104 is changed in accordance with the first deviation 101. The relative position reaches the target position at the time point t2, and the second deviation 102 is 0 at the time point t2. Therefore, the gain 103 and the control amount 104 are reduced as the second deviation 102 is reduced in a period from the time point t1 to the time point t2. The return operation after the overshoot is performed in a period from the time point t2 to the time point t3. The command value reaches the target position at the time point t3, and the stop setting operation is started at the time point t3. Note that the control amount 104 here corresponds to the phase difference.

Figure 9D:
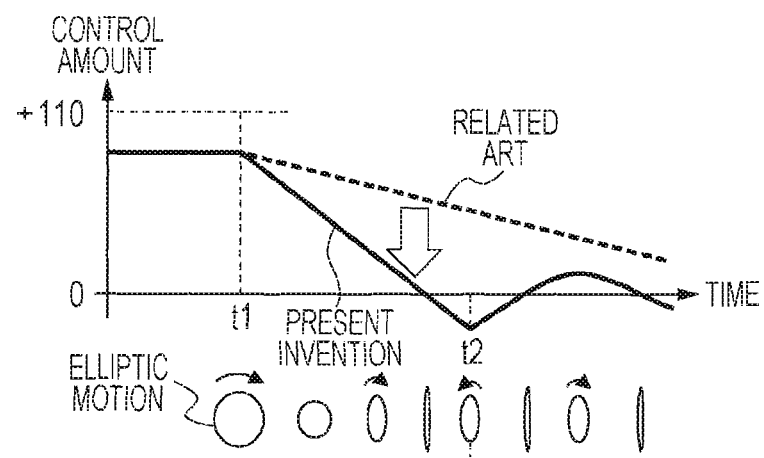

FIG. 9D is a diagram illustrating change of the control amount 104 in the period from the time point t1 to the time point t2 while a time axis is enlarged. As described above, as the time point t2 is reached, the phase difference corresponding to the control amount 104 is rapidly reduced, and amplitude of the elliptic motion in the driving direction is rapidly reduced when compared with the related art. Furthermore, a sign of the phase difference is inverted at the time point t2, and therefore, driving force in an inverted direction acts as reverse brake. The speed has been sufficiently reduced at the time point t2, and therefore, a setting may be performed in a short time after the time point t2.

Figure 9E:
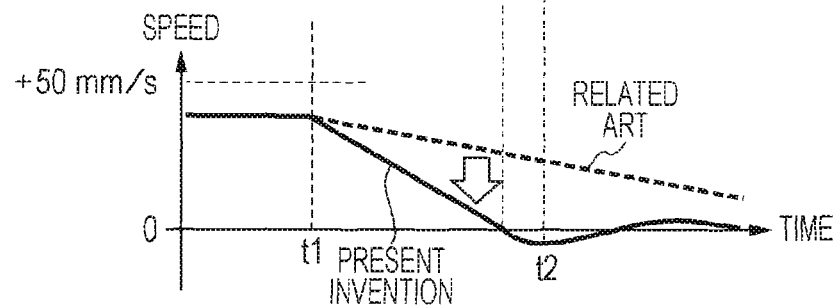

FIG. 9E is a diagram illustrating change of the speed of the vibration actuator 20 in the period from the time point t1 to the time point t2. As illustrated in FIG. 9E, the speed may be rapidly reduced when compared with the related art, and a stop operation may be reliably performed.

Figure 10:
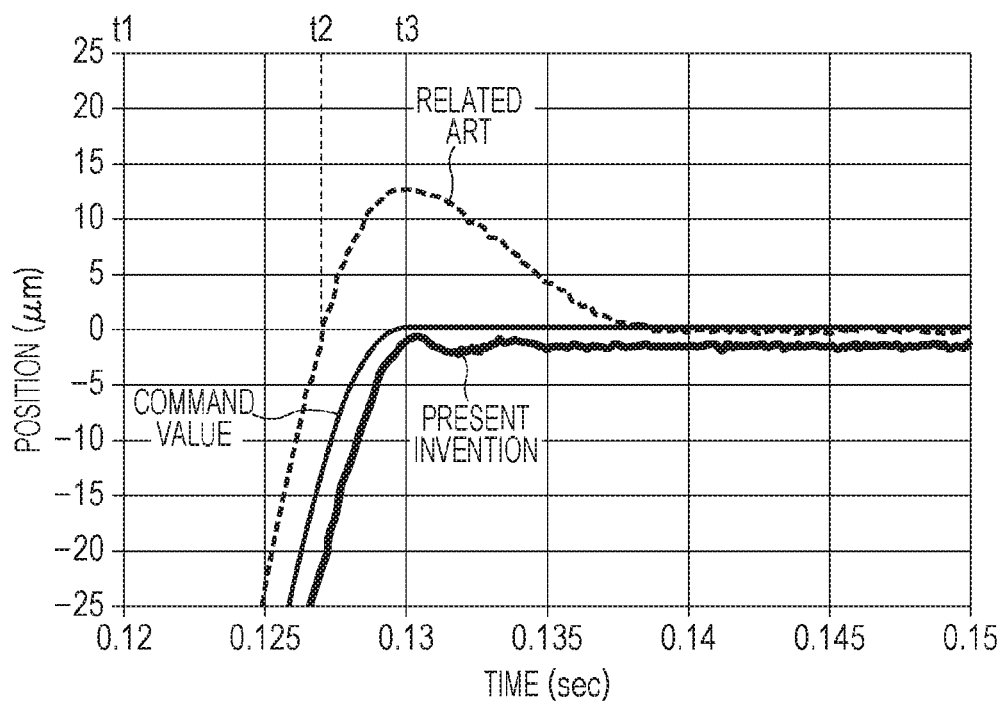
FIG. 10 is a graph illustrating a result of control performed by the control apparatus according to the first embodiment.

FIG. 10 is a graph illustrating a result of control performed by the control apparatus 10 according to the first embodiment. An axis of abscissae denotes time and an axis of ordinates denotes positions in a case where the target position is set to 0. As the result, a time domain before stop at the target position (a period from the time point t1 to the time point t3) and a time domain after the stop are illustrated in an enlarged manner. As plots, the command value, a result obtained using a general control apparatus, and a result obtained using the control apparatus 10 of this embodiment are illustrated. Measurement is performed under a driving condition in which a driving stroke from the start position to the target position is 12 mm, an acceleration time and a deceleration time are 50 ms each, and a maximum speed is 150 mm/s. Note that the general control apparatus employs PID control only using the first deviation 101.

Consequently, the overshoot is considerably improved and the shorter stabilization time is realized according to this embodiment when compared with the related art. Note that, in FIG. 10, the position from 0 to ±2.5 μm is within a range of a measurement error caused by wear out of the lens barrel, and therefore, it is not a problem when the apparatus is used. Accordingly, although a position obtained when the control apparatus 10 of this embodiment is used is not completely 0 in FIG. 10, the position is substantially 0 when the vibration actuator is used. That is, it is seen to be the target position has been reached.

Figure 11A:
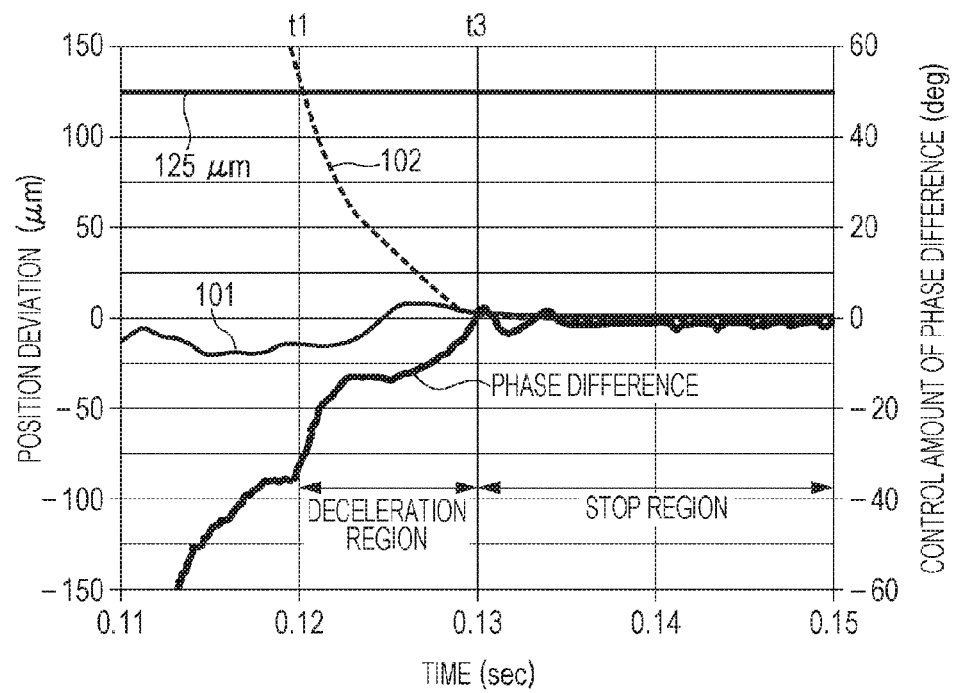
FIGS. 11A and 11B are diagrams illustrating change with time of the first and second deviations and a phase difference obtained as a result of the control according to the first embodiment.
Figure 11B:
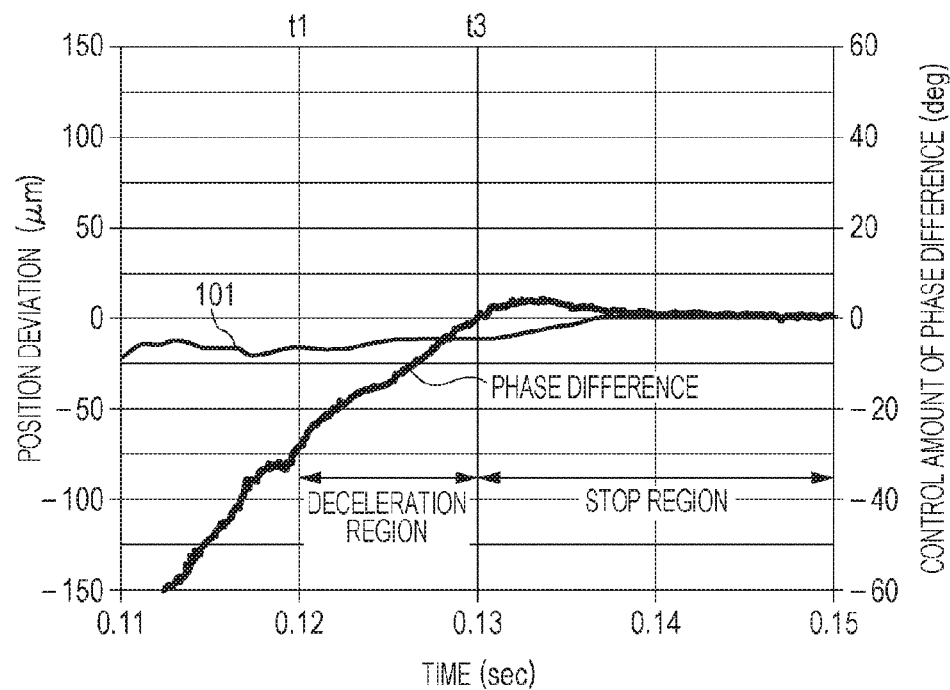

FIGS. 11A and 11B are diagrams illustrating change with time of the first and second deviations 101 and 102 and a phase difference obtained as a result of the control according to the first embodiment. An axis of abscissae denotes time, a left side of an axis of ordinates denotes a position deviation, and a right side of the axis of ordinates denotes a phase difference (the control amount 104). Specifically, FIG. 11A is a diagram illustrating a result obtained when the control apparatus 10 of this embodiment is employed, and FIG. 11B is a diagram illustrating a result obtained when the general control apparatus is employed. The second deviation 102 reaches the predetermined value of 125 μm at the time point t1 and the gain 103 is reduced in accordance with the second deviation 102. As illustrated, the phase difference is rapidly reduced in a deceleration driving period (from the time point t1 to the time point t3). A period after the time point t3 is a stop driving period which is set in a range of a small phase difference.

On the other hand, in the result obtained when the general control apparatus is employed in FIG. 11B, the phase difference is gradually changed in the deceleration driving period, and a stabilization time is long due to the return operation for the overshoot in a period after the time point t3.

According to this embodiment, as described above, the overshoot may be considerably reduced and the stabilization time may be reduced without deteriorating controllability. Furthermore, the stop operation may be efficiently performed by control using the inverse brake before stop in the target position.

Note that the same effect may be obtained by a control apparatus including a conversion unit for converting control parameters, such as a phase difference, a frequency, and a driving voltage, of the control amount 104 in the phase difference/frequency control unit 118 which is configured as below.

FIGS. 14A to 14D are diagrams illustrating a phase difference/frequency control unit including two of a phase difference conversion unit, a frequency conversion unit, and a driving voltage conversion unit.

Figure 14A:
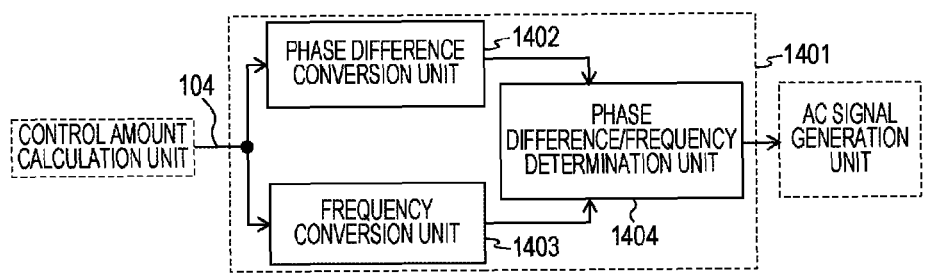
FIGS. 14A to 14D are diagrams illustrating modifications of a phase difference/frequency control unit according to the present invention.

Specifically, FIG. 14A is a diagram illustrating a configuration of frequency control in which a speed is changed only using a frequency and a driving direction is changed using a sign of a phase difference, and a case where a phase difference/frequency control unit 1401 is used as the phase difference/frequency control unit will be described. The phase difference/frequency control unit 1401 includes a phase difference conversion unit 1402 and a frequency conversion unit 1403. The control amount 104 is converted into a phase difference and a frequency by the phase difference conversion unit 1402 and the frequency conversion unit 1403, respectively, and a phase difference/frequency determination unit 1404 outputs the control parameters to the AC signal generation unit 112.

Figure 14B:
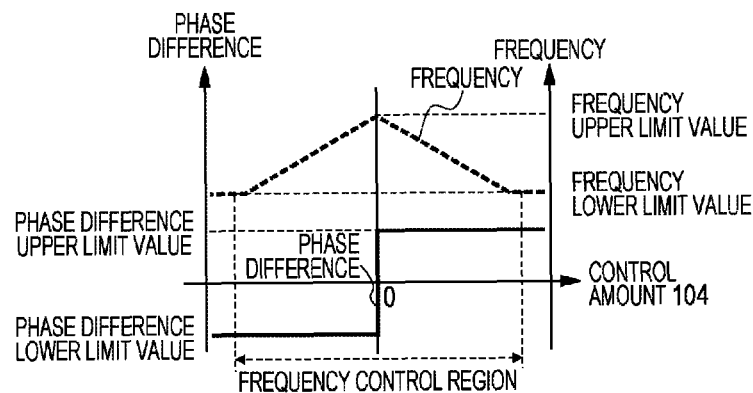

FIG. 14B is a diagram illustrating values of the phase difference and the frequency based on the control amount 104 which are obtained after the conversion. The frequency is converted in a range from an upper limit value to a lower limit value based on the control amount 104, and the phase difference changes a driving direction by inverting a sign of an upper limit value or a lower limit value.

Figure 14C:
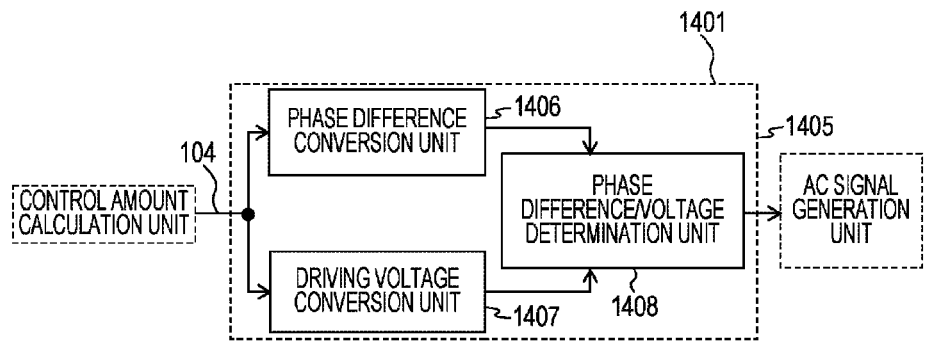

FIG. 14C is a diagram illustrating a configuration of phase difference/voltage control in which a speed is changed using the phase difference and the driving voltage. In a phase difference/voltage control unit 1405, the control amount 104 is converted into a phase difference and voltage amplitude by a phase difference conversion unit 1406 and a driving voltage conversion unit 1407, respectively, and the phase difference and the voltage amplitude are output as control parameters to the AC signal generation unit 112 from a phase difference/voltage determination unit 1408.

Figure 14D:
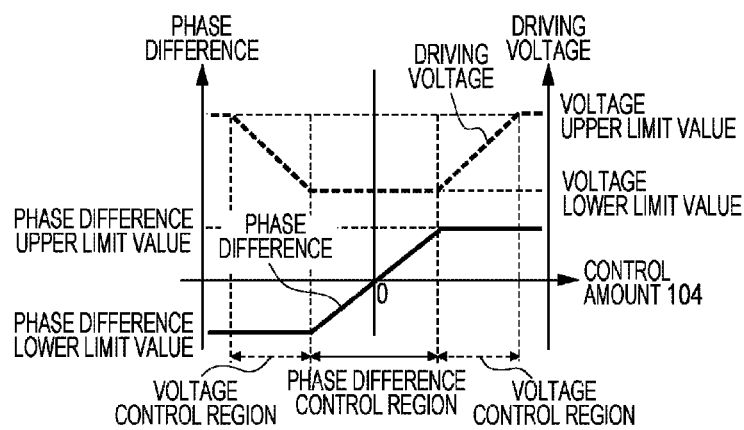

FIG. 14D is a diagram illustrating values of the phase difference and the driving voltage based on the control amount 104 which are obtained after the conversion. In a high-speed region, the driving voltage is changed in accordance with the control amount 104 in a range from an upper limit value to a lower limit value, and in a low-speed region, the phase difference is changed in accordance with the control amount 104 in a range from an upper limit value to a lower limit value. Specifically, the voltage control in the high-speed driving region and the phase difference control in the low-speed driving region are switched from one to another.

Second Embodiment

Next, a second embodiment of a control apparatus of a vibration driving apparatus will be described. In this embodiment, a control apparatus of a vibration actuator may reliably perform a setting after stop in a target position, and driving power may be reduced.

Figure 12:
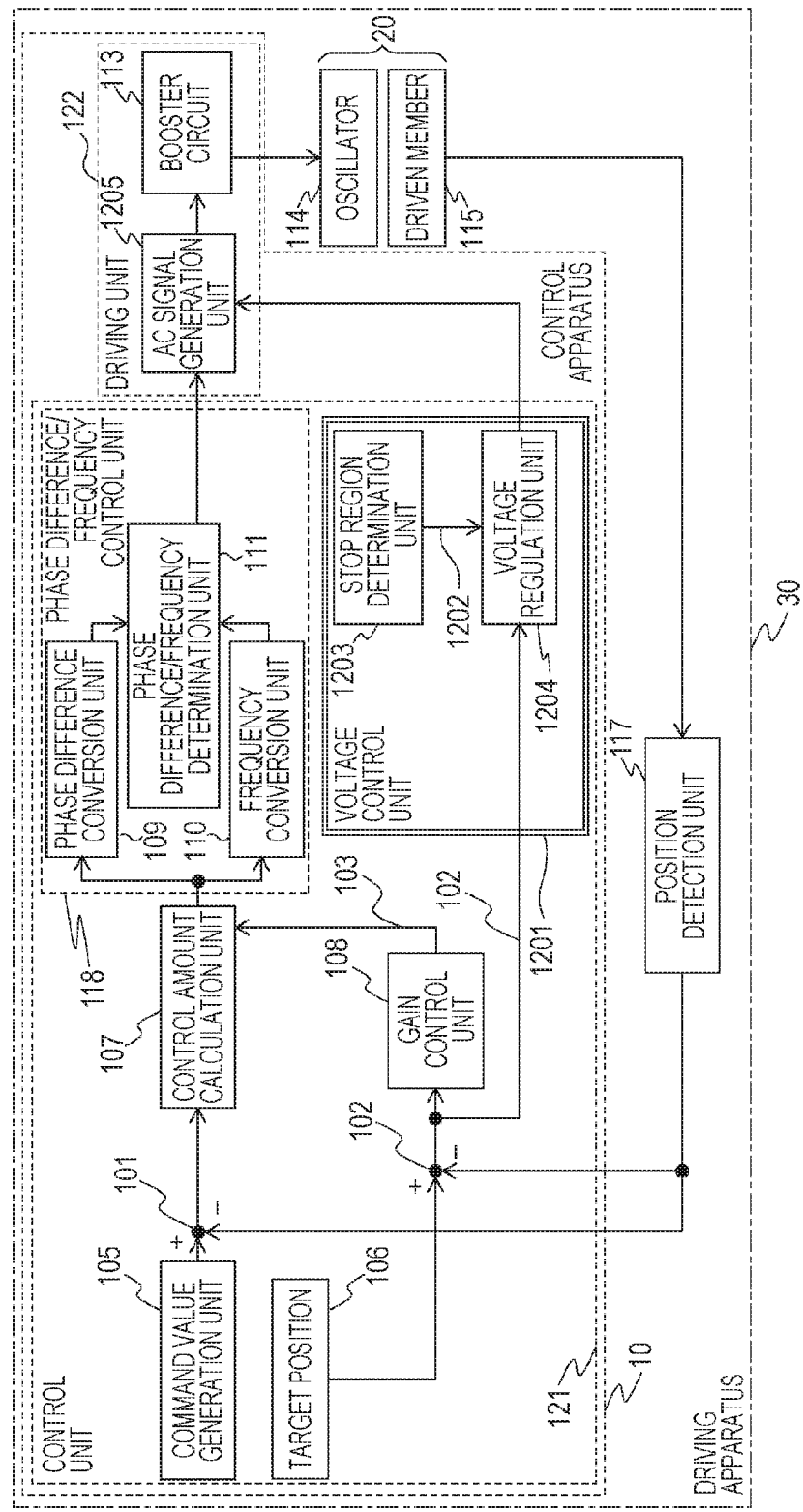
FIG. 12 is a diagram illustrating a vibration actuator and a control apparatus of the vibration actuator according to a second embodiment of the present invention.

FIG. 12 is a diagram illustrating the control apparatus of the vibration actuator according to the second embodiment. Components other than a voltage control unit 1201 are the same as those of the first embodiment, and descriptions thereof are omitted. The voltage control unit 1201 of this embodiment includes a stop region determination unit 1203 and a voltage control unit 1204. The stop region determination unit 1203 brings a voltage control command 1202 into an on state and the voltage control unit 1204 is brought into an enable state in a period in which a command value changed with time matches a target position. In this case, the voltage control unit 1204 changes a pulse width of an AC pulse signal based on a second deviation 102, and a driving voltage of an AC signal generation unit 1205 is changed.

Note that, in a case where the voltage control command 1202 is in an off state, the voltage control unit 1204 outputs a fixed pulse width, and therefore, the driving voltage is not changed.

Figure 13A:
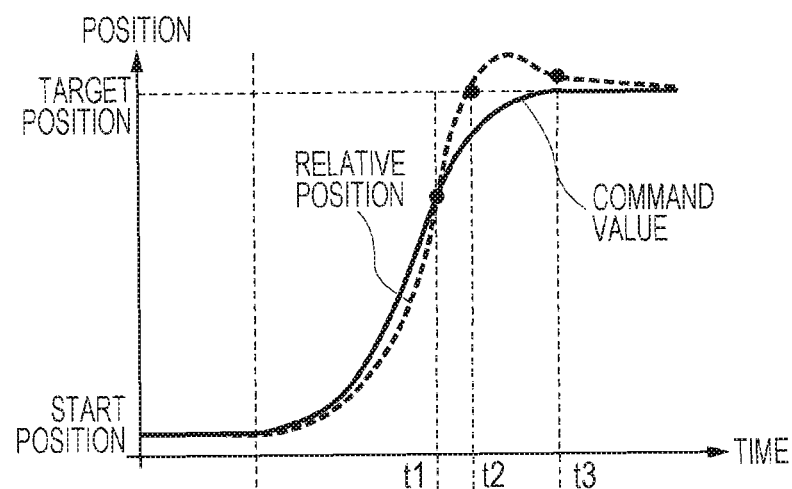
FIGS. 13A to 13E are timing charts of the control apparatus according to the second embodiment.

FIGS. 13A to 13E are timing charts of the control apparatus according to this embodiment. Specifically, FIG. 13A is a diagram illustrating change with time of the command value and a relative position in a range from a start position to a target position. As with the first embodiment, control of this embodiment will be described while time points t1, t2, and t3 are focused.

Figure 13B:
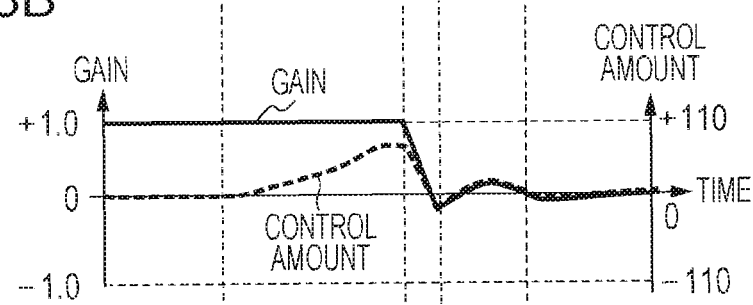

FIG. 13B is a diagram illustrating change with time of a gain 103 and a control amount 104 based on the second deviation 102. The gain 103 maintains 1.0 until the time point t1, and therefore, the control amount 104 is changed in accordance with a first deviation 101. The relative position reaches the target position at the time point t2, and the second deviation 102 is 0 at the time point t2. Therefore, the gain 103 and the control amount 104 are reduced as the second deviation 102 is reduced in a period of time from the time point t1 to the time point t2. The control amount 104 here corresponds to a phase difference.

Figure 13C:
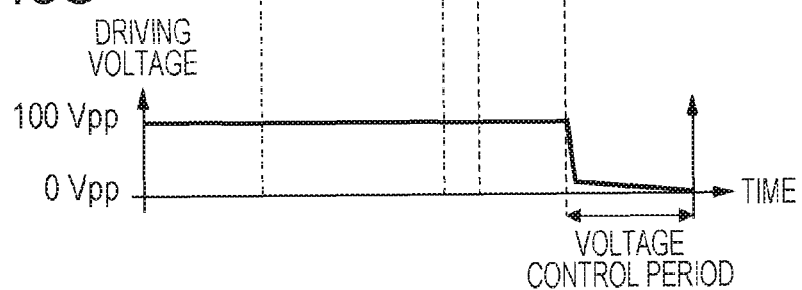

FIG. 13C is a diagram illustrating change with time of the driving voltage controlled by the voltage control unit 1204. A fixed value of the driving voltage (100 Vpp, for example) is output until the time point t3 in which the command value matches the target position is reached. At the time point t3, when the voltage control unit 1204 is brought into an enable state, a pulse width of an AC pulse signal output from the voltage control unit 1204 is changed in accordance with a second deviation. Specifically, a period after the time point t3 corresponds to a voltage control period.

Figure 13D:
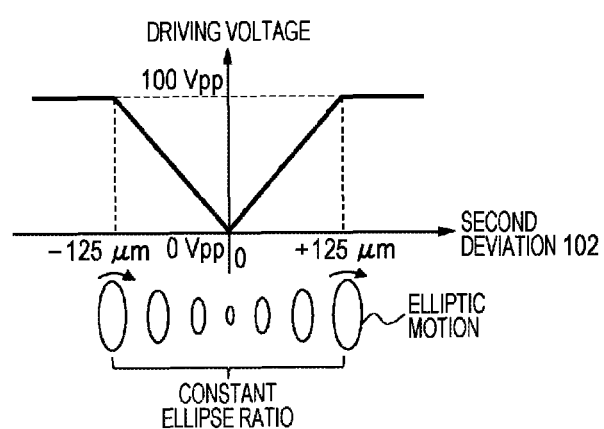

FIG. 13D is a diagram illustrating a look-up table of the driving voltage controlled based on the second deviation 102. Specifically, the driving voltage may be controlled as illustrated in FIG. 13D when a look-up table of a pulse width which is changed based on the second deviation 102 is used. Note that the look-up table is not limited to this, and as with a look-up table of a gain, examples illustrated in FIGS. 15A to 15C may be used. Furthermore, the look-up table may be a mathematized.

Figure 15A:
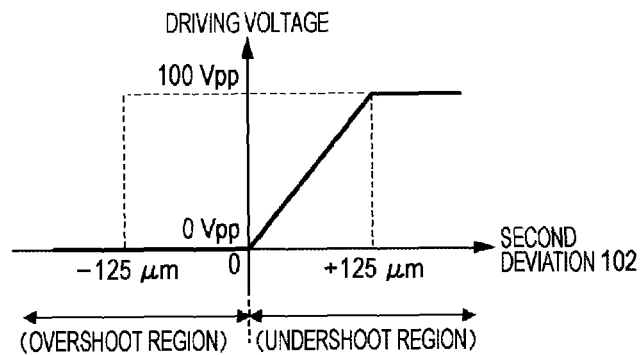
FIGS. 15A to 15C are diagrams illustrating look-up tables to be used in a voltage control unit according to the present invention.

Tables illustrated in FIGS. 15A to 15C will be described. Axes of abscissae indicate the second deviation 102 and axes of ordinates indicate the driving voltage. First, an undershoot region on a right side in FIG. 15A will be described. The undershoot region indicates a region in which the relative position has not reached the target position, that is, a region in which a movement is performed at constant speed to the target position (a constant driving period) or a region in which a deceleration movement is performed (a deceleration driving period). In a region in which the second deviation 102 is equal to or larger than +125 µm, the driving voltage is constant, that is, 100 Vpp, and the driving voltage is reduced as the second deviation 102 is reduced toward the target position. When the second deviation 102 is 0 µm, the driving voltage is 0, and the voltage control unit 1204 performs control such that the driving voltage is 0 in an overshoot region in which a relative position exceeds the target position. Specifically, when the overshoot occurs, the relative position is stopped by static friction force of a friction contact portion.

Figure 15B:
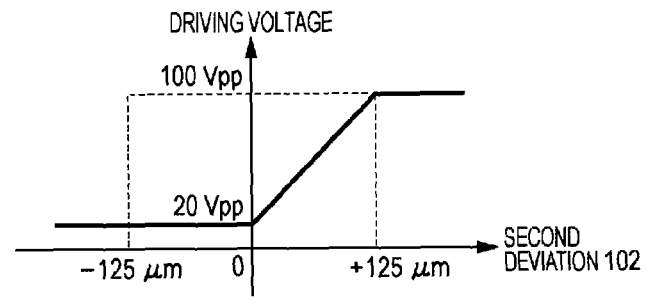

FIG. 15B is a diagram illustrating the driving voltage controlled to be 20 Vpp in the overshoot region. In this case, since a minimum voltage which enables driving is 20 Vpp, and therefore, the relative position is stopped in a region in which kinetic friction force of the friction contact portion becomes maximum and a speed is controllable at the time of the overshoot.

Figure 15C:
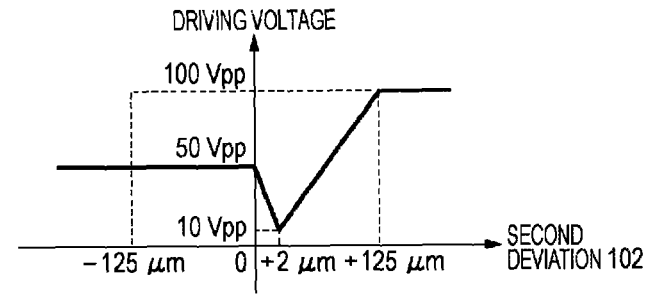

FIG. 15C is a diagram illustrating improvement of accuracy of the stop setting. A driving voltage is reduced to 10 Vpp until the second deviation 102 is +2 µm, and increased up to 50 Vpp again in a portion in the vicinity of the target position. Specifically, although control based on the second deviation 102 is dominant until the second deviation 102 is +2 µm, a rate of control based on the first deviation 101 is increased a little in the vicinity of the target position. In this way, the relative position may reach the target position without generation of the overshoot region. Although the driving voltage is increased when the second deviation 102 is +2 µm in this embodiment, a deviation corresponding to target accuracy of a stop setting is set.

As described above, as the driving voltage is reduced by changing the pulse width in accordance with reduction of the second deviation 102, the elliptic motion of the driving unit has a constant elliptical ratio and reduced amplitude if a phase difference is constant. Specifically, a stop operation and attenuation of vibration may be performed using the friction braking force of the driving unit by reducing the amplitude of the elliptic motion. Here, the attenuation of the vibration indicates regulatory vibration attenuation (oscillation suppression). Accordingly, the stop operation and the setting operation may be reliably performed by the friction braking force of the voltage control while the overshoot is reduced by the control using the gain 103 based on the second deviation 102. Furthermore, power consumption after the stop operation may be considerably reduced as a result of the reduction of the driving voltage.

Figure 13E:
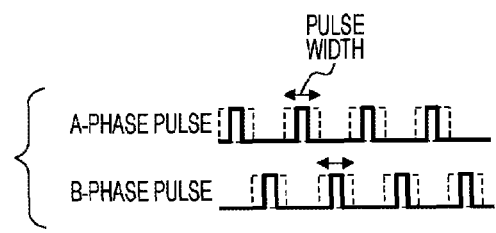

FIG. 13E is a diagram illustrating simulation of change of pulse widths of an A-phase pulse signal and a B-phase pulse signal at a time of voltage control. Dotted lines denote the pulse widths of the A-phase and B-phase pulse signals when the pulse widths are large, and solid lines denote the pulse widths of the A-phase and B-phase pulse signals when the pulse widths are small.

As with the first embodiment, use of the control apparatus of the vibration actuator of this embodiment may enhance responsivity of the stop operation as the target position is reached and reduce the overshoot and the stabilization time without deteriorating controllability. Furthermore, according to the control apparatus of this embodiment, in addition to the reduction of the overshoot and the stabilization time, the reliable stop operation using the friction braking force and the reduction of the power consumption may be realized.

Third Embodiment

Figure 16B:
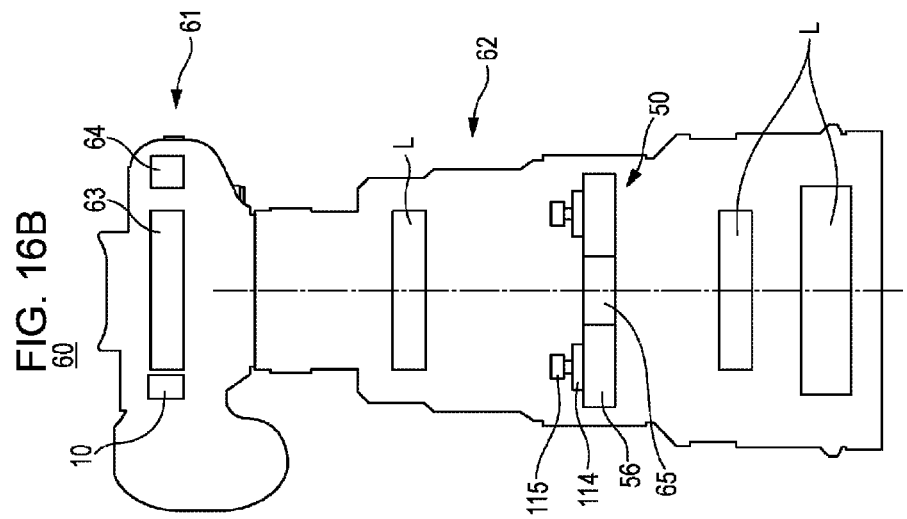
FIG. 16B is a diagram schematically illustrating an internal configuration of the imaging apparatus.
Figure 16A:
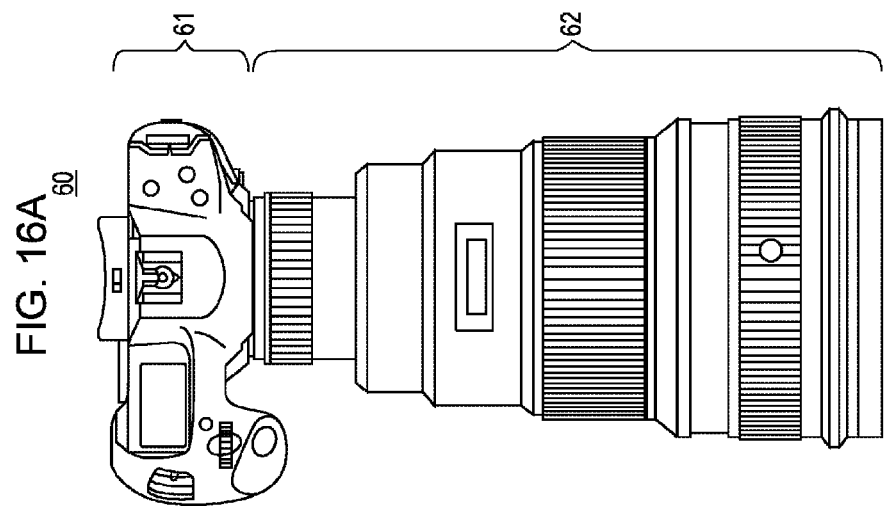
FIG. 16A is a plan view of appearance of an imaging apparatus serving as the control apparatus according to the present invention.

Although the case where the control apparatus of the vibration actuator is used for driving of an autofocus lens of an imaging apparatus is described as examples in the first and second embodiments, application of the present invention is not limited to this. As illustrated in FIGS. 16A and 16B, the present invention is applicable to driving of a lens and imaging element at a time of camera-shake correction. FIG. 16A is a plan view (a top view) of appearance of an imaging apparatus 60. FIG. 16B is a diagram schematically illustrating an internal configuration of the imaging apparatus 60.

The imaging apparatus 60 mainly includes a body 61 and a lens barrel 62 which is detachable from the body 61. The body 61 includes an imaging element 63, such as a CCD sensor or a CMOS sensor, which converts an optical image formed by light transmitted through the lens barrel 62 into an image signal and a camera control microcomputer 64 which controls entire operation of the imaging apparatus 60. The lens barrel 62 includes a plurality of lenses L, such as focus lenses or zoom lenses, in predetermined positions. Furthermore, the lens barrel 62 incorporates an image blur correction device 50 which includes a disc member 56 and a vibrator 114 disposed on the disc member 56, and further includes an image blur correction lens 65 in a hole portion formed at the center of the disc member 56. The image blur correction device 50 is capable of moving the image blur correction lens 65 on a plane which is orthogonal to an optical axis of the lens barrel 62. In this case, the vibrator 114 is driven by the control apparatus 10 of the present invention so that the vibrator 114 and the disc member 56 are moved relative to a driven member 115 fixed to the lens barrel 62 and the correction lens is driven.

Furthermore, the control apparatus of the present invention may be used for driving of a lens holder used to move a zoom lens. Accordingly, the control apparatus of the present invention may be mounted on an interchangeable lens for lens driving in addition to the imaging apparatus.

Figure 17:
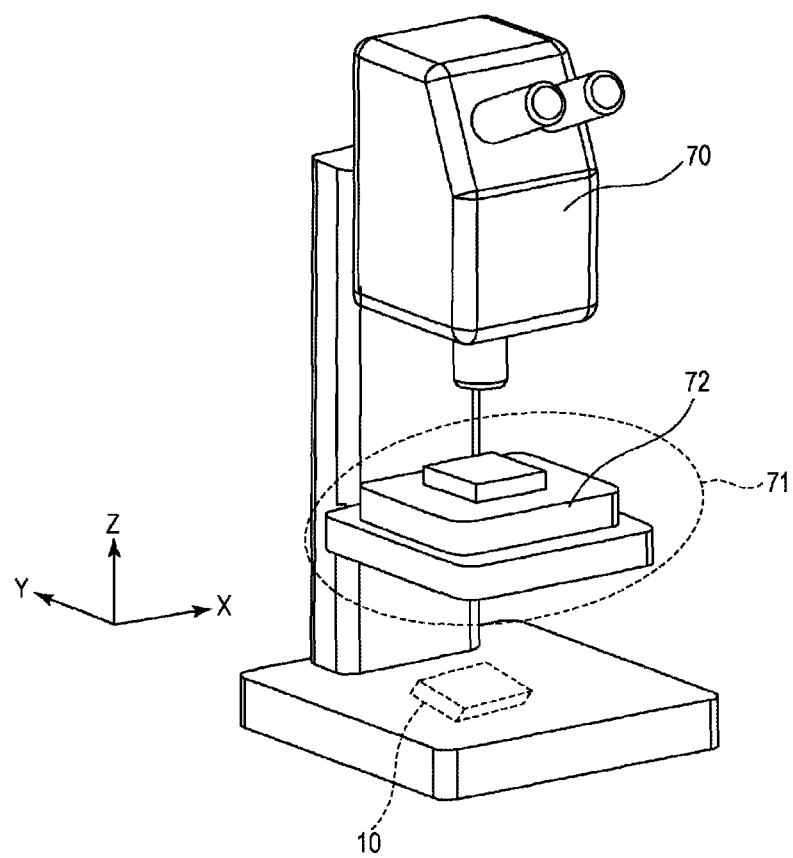
FIG. 17 is a diagram illustrating appearance of a microscope employing the control apparatus according to the present invention.

Furthermore, the control apparatuses of the vibration actuators according to the first and second embodiments may be used for driving of an automatic stage. As illustrated in FIG. 17, the present invention is applicable to an automatic stage of a microscope.

The microscope illustrated in FIG. 17 includes an imaging unit 70 incorporating an imaging element and an optical system and an automatic stage 71 including a stage 72 which is disposed on a base and moved by the vibration actuator. An object to be observed is placed on the stage 72 and an enlarged image of the object is captured by the imaging unit 70. In a case where an observation range is large, the stage 72 is moved by driving the vibration actuator using the control apparatus 10 of the first embodiment or the second embodiment. By this, a large number of captured images may be obtained by moving the object to be observed in an X direction or a Y direction. The captured images are coupled with one another using a computer, not illustrated, so that one image of a large observation range may be obtained with high resolution.

According to the embodiment, overshoot may be reduced without deteriorating controllability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-140856, filed Jul. 14, 2015, which is hereby incorporated by reference herein in its entirety.

What is claimed is:

1. A control apparatus of a vibration actuator, the control apparatus including a control unit comprising:
a unit configured to obtain a relative position between a vibrator and a driven member by a position detection unit, and to output a first deviation, which is a difference between the relative position and a command value of the relative position;
a gain control unit configured to obtain a second deviation, which is a difference between the relative position and a target position of the relative position, and to a output a gain based on the second deviation; and
a control amount calculation unit configured to output a control amount to be used to control driving of the vibrator using the first deviation and the gain,
wherein the gain control unit reduces the gain output in accordance with reduction of the second deviation, and
the relative position between the vibrator and the driven member is changed due to driving of the vibrator.

2. The control apparatus of the vibration actuator according to claim 1, the control apparatus further comprising a control parameter generation unit configured to generate a control parameter based on the control amount.

3. The control apparatus of the vibration actuator according to claim 1, the control apparatus further comprising a driving unit configured to generate an AC signal to be applied to the vibrator based on output of the control unit.

4. The control apparatus of the vibration actuator according to claim 3, wherein an elliptic motion is generated in a driving unit of the vibrator by applying the AC signal to the vibrator, and the relative position between the vibrator and the driven member is changed by the elliptic motion.

5. The control apparatus of the vibration actuator according to claim 1, wherein the control unit reduces the gain in accordance with reduction of the second deviation in a deceleration driving period and a stop driving period.

6. The control apparatus of the vibration actuator according to claim 1, wherein the control unit reduces the gain in accordance with reduction of the second deviation in a period from when deceleration of the vibration actuator is started to when the second deviation becomes 0.

7. The control apparatus of the vibration actuator according to claim 1, wherein the gain control unit inverts a sign of the gain when the second deviation reaches a certain value.

8. The control apparatus of the vibration actuator according to claim 7, wherein the certain value is a deviation corresponding to target accuracy of a stop setting.

9. The control apparatus of the vibration actuator according to claim 1, wherein the gain control unit increases the gain when the second deviation reaches a certain value.

10. The control apparatus of the vibration actuator according to claim 9, wherein the certain value is a deviation corresponding to target accuracy of a stop setting.

11. The control apparatus of the vibration actuator according to claim 1, wherein the control amount is obtained by multiplying a value obtained by performing PID calculation on the first deviation by the gain.

12. The control apparatus of the vibration actuator according to claim 1, wherein the control amount is obtained by performing PID calculation on a value obtained by multiplying the first deviation by the gain.

13. The control apparatus of the vibration actuator according to claim 2, wherein the control parameter controls at least one of an ellipse ratio, amplitude, and a driving direction of the elliptic motion.

14. The control apparatus of the vibration actuator according to claim 2, wherein the AC signal includes a phase, a frequency, or a driving voltage set in accordance with the control parameter.

15. The control apparatus of the vibration actuator according to claim 2, the control apparatus further comprising:
a voltage control unit; and
an AC signal generation unit configured to generate the AC signal in accordance with an output of the control parameter generation unit and an output of the voltage control unit.

16. A driving apparatus comprising
a vibration actuator; and
the control apparatus of the vibration actuator set forth in claim 1.

17. An interchangeable lens comprising:
a lens; and
the control apparatus of the vibration actuator set forth in claim 1 which drives the lens by driving the driven member.

18. An imaging apparatus comprising:
an imaging element;
a lens; and
the control apparatus of the vibration actuator set forth in claim 1 which drives the lens by driving the driven member.

19. An imaging apparatus comprising:
a lens;
an imaging element; and
the control apparatus of the vibration actuator set forth in claim 1 which drives the imaging element by driving the driven member.

20. An automatic stage comprising:
a stage; and
the control apparatus of the vibration actuator set forth in claim 1 configured to drive the stage by driving the driven member.

21. A method for controlling a vibration actuator, the method comprising:
obtaining a relative position between a vibrator including an electric-mechanical energy conversion element and a driven member, and obtaining a first deviation, which is a difference between the relative position and a command value related to the relative position;
obtaining a second deviation, which is a difference between a target position of the relative position and the relative position;
reducing a gain in accordance with reduction of the second deviation; and
generating an AC signal for driving the vibrator in accordance with the gain and the first deviation.

22. The method for controlling the vibration actuator according to claim 21,
wherein the generating includes generation of a control amount of the vibration in accordance with the controlled gain and the first deviation, and
the control amount is used to control an ellipse ratio, amplitude, or a driving voltage of an elliptic motion generated in a driving unit of a vibrator driven by the AC signal.

23. The method for controlling the vibration actuator according to claim 22, wherein a phase, a frequency, or a driving voltage of the AC signal is set in accordance with the driving control.

24. A control apparatus of a vibration actuator, the control apparatus including a controller comprising:
one or more processors; and
one or more memories storing instructions that, when executed by the one or more processors, cause the control apparatus to perform operations comprising:
obtaining a relative position between a vibrator and a driven member by a position detector, and outputting a first deviation, which is a difference between the relative position and a command value of the relative position;
performing a gain control process for obtaining a second deviation, which is a difference between the relative position and a target position of the relative position, and outputting a gain based on the second deviation; and
outputting a control amount to be used to control driving of the vibrator using the first deviation and the gain,
wherein the gain control process reduces the gain output in accordance with reduction of the second deviation, and the relative position between the vibrator and the driven member is changed due to driving of the vibrator.

25. The control apparatus of the vibration actuator according to claim 24, the operations further comprising a control parameter generation process for generating a control parameter based on the control amount.

26. The control apparatus of the vibration actuator according to claim 24, the operations further comprising generating an AC signal to be applied to the vibrator based on output of the controller unit.

27. The control apparatus o the vibration actuator according to claim 26, wherein an elliptic motion is generated in a driver of the vibrator by applying the AC signal to the vibrator, and the relative position between the vibrator and the driven member is changed by the elliptic motion.

28. The control apparatus of the vibration actuator according to claim 24, wherein the controller reduces the gain in accordance with reduction of the second deviation in a deceleration driving period and a stop driving period.

29. The control apparatus of the vibration actuator according to claim 24, wherein the controller reduces the gain in accordance with reduction of the second deviation in a period from when deceleration of the vibration actuator is started to when the second deviation becomes 0.

30. The control apparatus of the vibration actuator according to claim 24, wherein the gain control process inverts a sign of the gain when the second deviation reaches a certain value.

31. The control apparatus of the vibration actuator according to claim 30, wherein the certain value is a deviation corresponding to target accuracy of a stop setting.

32. The control apparatus of the vibration actuator according to claim 24, wherein the gain control process increases the gain when the second deviation reaches a certain value.

33. The control apparatus of the vibration actuator according to claim 32, wherein the certain value is a deviation corresponding to target accuracy of a stop setting.

34. The control apparatus of the vibration actuator according to claim 24, wherein the control amount is obtained by multiplying a value obtained by performing PID calculation on the first deviation by the gain.

35. The control apparatus of the vibration actuator according to claim 24, wherein the control amount is obtained by performing PID calculation on a value obtained by multiplying the first deviation by the gain.

36. The control apparatus of the vibration actuator according to claim 25, wherein the control parameter controls at least one of an ellipse ratio, amplitude, and a driving direction of the elliptic motion.

37. The control apparatus of the vibration actuator according to claim 25, wherein the AC signal includes a phase, a frequency, or a driving voltage set in accordance with the control parameter.

38. The control apparatus of the vibration actuator according to claim 25, the operations further comprising:
performing a voltage control process for controlling voltage; and
generating an AC signal in accordance with an output of the control parameter generation process and an output of the voltage control process.

39. A driving apparatus comprising
a vibration actuator; and
the control apparatus of the vibration actuator set forth in claim 24.

40. An interchangeable lens comprising:
a lens; and
the control apparatus of the vibration actuator set forth in claim 24 which drives the lens by driving the driven member.

41. An imaging apparatus comprising:
an imaging element;
a lens; and
the control apparatus of the vibration actuator set forth in claim 24 which drives the lens by driving the driven member.

42. An imaging apparatus comprising:
a lens;
an imaging element; and
the control apparatus of the vibration actuator set forth in claim 24 which drives the imaging element by driving the driven member.

43. An automatic stage comprising:
a stage; and
the control apparatus of the vibration actuator set forth in claim 24 configured to drive the stage by driving the driven member.

* * * * *